United States Patent
Brown

(10) Patent No.: US 11,846,531 B2
(45) Date of Patent: Dec. 19, 2023

(54) ULTRASONIC FLOW METER WITH INNER AND OUTER FLOW CHANNELS

(71) Applicant: Sensia LLC, Houston, TX (US)

(72) Inventor: Gregor James Brown, Prestwick (GB)

(73) Assignee: Sensia LLC, Houston, TX (US)

(*) Notice: Subject to any disclaimer, the term of this patent is extended or adjusted under 35 U.S.C. 154(b) by 104 days.

(21) Appl. No.: 17/459,195

(22) Filed: Aug. 27, 2021

(65) Prior Publication Data

US 2023/0063460 A1    Mar. 2, 2023

(51) Int. Cl.
*G01F 1/66*    (2022.01)
*G01F 1/667*    (2022.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| | | | | |
|---|---|---|---|---|
| 790,888 A | | 5/1905 | Ferris | |
| 4,365,518 A | * | 12/1982 | Zacharias, Jr. | ............ G01F 1/66 73/861.31 |
| 4,524,616 A | * | 6/1985 | Drexel | ...................... G01F 5/00 73/203 |
| 5,824,894 A | * | 10/1998 | Lucas | ...................... G01F 15/00 73/202.5 |
| 5,907,099 A | * | 5/1999 | Huang | ..................... G01F 1/662 73/861.31 |
| 6,338,277 B1 | * | 1/2002 | Diston | ..................... G01F 1/662 73/861.27 |
| 8,683,875 B2 | * | 4/2014 | Lawrence | ................. G01F 1/36 73/861.65 |
| 10,859,415 B2 | * | 12/2020 | Munro | ....................... G01F 1/34 |
| 11,555,721 B2 | * | 1/2023 | Andrii | ....................... G01F 5/00 |
| 2007/0006640 A1 | | 1/2007 | Gysling | |
| 2009/0044636 A1 | | 2/2009 | Hope | |
| 2012/0180572 A1 | * | 7/2012 | Lawrence | ................. G01F 1/46 29/407.01 |
| 2018/0120139 A1 | | 5/2018 | Sonnenberg | |
| 2020/0400473 A1 | | 12/2020 | Andrii et al. | |
| 2021/0080302 A1 | * | 3/2021 | Davey | ..................... G01F 1/662 |

OTHER PUBLICATIONS

International Search Report and Written Opinion on PCT Appl. Ser. No. PCT/US2022/041716 dated Dec. 23, 2022 (16 pages).
PCT Written Opinion of the International Preliminary Examining Authority for Appl. Ser. No. PCT/US2022/041716 dated Jul. 13, 2023 (11 pages).

* cited by examiner

*Primary Examiner* — Harshad R Patel
(74) *Attorney, Agent, or Firm* — Foley & Lardner LLP

(57) ABSTRACT

A flow meter is shown. The flow meter includes a housing extending along an axis and defining an interior volume, the interior volume extending between an inlet port and an outlet port. The flow meter further includes an insert positioned within the interior volume and spaced apart from the housing, the insert extending along the axis. A first region between at least part of the insert and the housing along the axis defines a first flow pathway, and a second region within the insert and along the axis defines a second flow pathway.

18 Claims, 7 Drawing Sheets

ULTRASONIC FLOW METER WITH INNER AND OUTER FLOW CHANNELS

BACKGROUND

Certain flow meters may measure fluid flow containing a significant quantity of liquid (e.g., as opposed to gaseous material) within the fluid stream. Ultrasonic meters can be applied to such scenarios, but may obtain signals with significant noise when the liquid interferes with the ultrasonic measurement (e.g., as the liquid can accumulate on or around the ultrasonic transducer housing, etc.). Certain attempts to solve this problem have involved making larger gaps around transducer housings or installing ports to designed to drain liquid from around the housings. These methods have only limited success.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a flow meter. The flow meter includes a housing extending along an axis and defining an interior volume, the interior volume extending between an inlet port and an outlet port. The flow meter includes an insert positioned within the interior volume and spaced apart from the housing, the insert extending along the axis. In some embodiments, a first region between at least part of the insert and the housing along the axis defines a first flow pathway, and a second region within the insert and along the axis defines a second flow pathway.

In some embodiments, the cross-sectional area of the first flow pathway varies as the first flow pathway extends along the axis.

In some embodiments, the cross-sectional area of the second flow pathway varies as the second flow pathway extends along the axis.

In some embodiments, a surface of the insert perpendicular to the axis is at least one of a tapered surface or a contoured surface.

In some embodiments, the inlet port and the outlet port are disposed along the axis.

In some embodiments, the insert is coupled to the hosing using a coupling element, the coupling element includes a plurality of apertures that can facilitate flow through the coupling element.

In some embodiments, the flow meter is an ultrasonic flow meter. In some embodiments, the ultrasonic flow meter further includes a plurality of ultrasonic transducers disposed at least partially within at least one of the housing or the housing and the insert.

In some embodiments, the flow meter further includes a pressure sensor configured to obtain differential pressure measurements within the interior volume.

Another implementation of the present disclosure is a system for monitoring flow of a fluid. The system includes a flow meter. The flow meter includes a housing extending along an axis and an interior volume, the interior volume including an inlet port and an outlet port. The flow meter further includes an annular insert positioned within the interior volume and radially spaced apart from the housing, the annular insert extending along the axis. In some embodiments, the annular insert includes a first surface along the axis and a second surface perpendicular to the axis. In some embodiments, the cross-sectional area of the first surface perpendicular to the axis varies as the first surface extends along the axis.

In some embodiments, the first surface of the annular insert is at least one of a tapered surface extending along the axis or a contoured surface extending along the axis.

In some embodiments, the second surface of the annular insert is at least one of a tapered surface or a contoured surface.

In some embodiments, the inlet port and the outlet port are disposed along the axis.

In some embodiments, the annular insert is coupled to the hosing using an annular coupling element, the annular coupling element including a plurality of apertures that can facilitate flow through the annular coupling element.

In some embodiments, the flow meter is an ultrasonic flow meter and the system further includes a plurality of ultrasonic transducers disposed at least partially within at least one of the housing or the housing and the annular insert.

In some embodiments, the flow meter further includes a pressure sensor configured to obtain differential pressure measurements within the interior volume.

Another implementation of the present disclosure is a method for obtaining flow measurements. The method includes receiving fluid via an inlet port of a flow meter. The method further includes separating the fluid using an annular insert disposed within an interior volume of the flow meter, the annular insert radially spaced apart from a housing of the flow meter and aligned with the housing on an axis. The method further includes obtaining flow measurements of a first separated portion of the fluid within a first region defined within the annular insert. The method further includes rejoining the first separated portion of the fluid and a second separated portion of the fluid within a second region defined between at least part of the annular insert and the housing.

In some embodiments, the second separated portion of the fluid includes a greater proportion of fluid by volume than the first separated portion of the fluid.

In some embodiments, obtaining the flow measurements of the first separated portion of the fluid includes using a plurality of ultrasonic transducers to obtain the flow measurements, wherein the plurality of ultrasonic transducers are disposed at least partially within at least one of the housing or the housing and the annular insert.

In some embodiments, separating the fluid using the annular insert includes separating the fluid using a first surface of the annular insert, wherein the cross-sectional area of the first surface perpendicular to the axis varies as the first surface extends along the axis.

In some embodiments, in response to the fluid contacting the first surface, the fluid is separated into the first separated portion of the fluid and the second separated portion of the fluid.

DETAILED DESCRIPTION

Overview

Referring generally to the FIGURES, embodiments of an apparatus (e.g., flow meter, ultrasonic flow meter, etc.) that can separate fluid into at least two portions. In some embodiments, this is implemented to reduce noise received by ultrasonic transducers obtaining fluid measurements of the fluid within the flow meter.

In one non-limiting example, a wet-gas flow (e.g., a volume of fluid including at least a portion of gaseous fluid and a portion of liquid fluid, etc.) can be separated by a dividing element (e.g., an insert within the flow meter, an insert within the fluid pathway, etc.) such that the wet-gas flow can be separated into two main channels (e.g., flow pathways, etc.): an outer channel (e.g., between the housing of the flow meter and the dividing element, etc.) and an inner channel (e.g., the pathway within the dividing element, etc.). Transducer housings can extend from the meter body through the outer flow channel and the dividing element such that it is positioned with one end near the end of the central channel. The transducers within the transducer housings can obtain measurements of the fluid within the inner channel. In some embodiments, the transducers are arranged in pairs such that the transmission from one transducer and reception on another forms a transit time measurement path through the central channel.

In some embodiments, the dividing element is generally positioned within the center of the housing of the flow meter (e.g., concentrically, etc.). The dividing element may be an annular element that is placed within the flow meter. The dividing element may be extended along the axis of the flow meter, and may include any number of end formations (e.g., tapered end(s), contoured ends, etc.). In some embodiments, in a wet-gas application, at least a portion of the liquid portion of the flow can adhere to the pipe walls, and the majority of the liquid would be expected to pass through the outer passage, while the fluid passing through the central passage would have a higher gas volume fraction than the overall flow. This may then permit the ultrasonic measurements to be performed in the central passage where there is less liquid, which can reduce the problem of liquid affecting the ultrasonic measurements. In some embodiments, this can be applicable to laminar flow applications, where the thermal boundary layer can be separated from the main flow.

Flow System Overview

Figure 1:
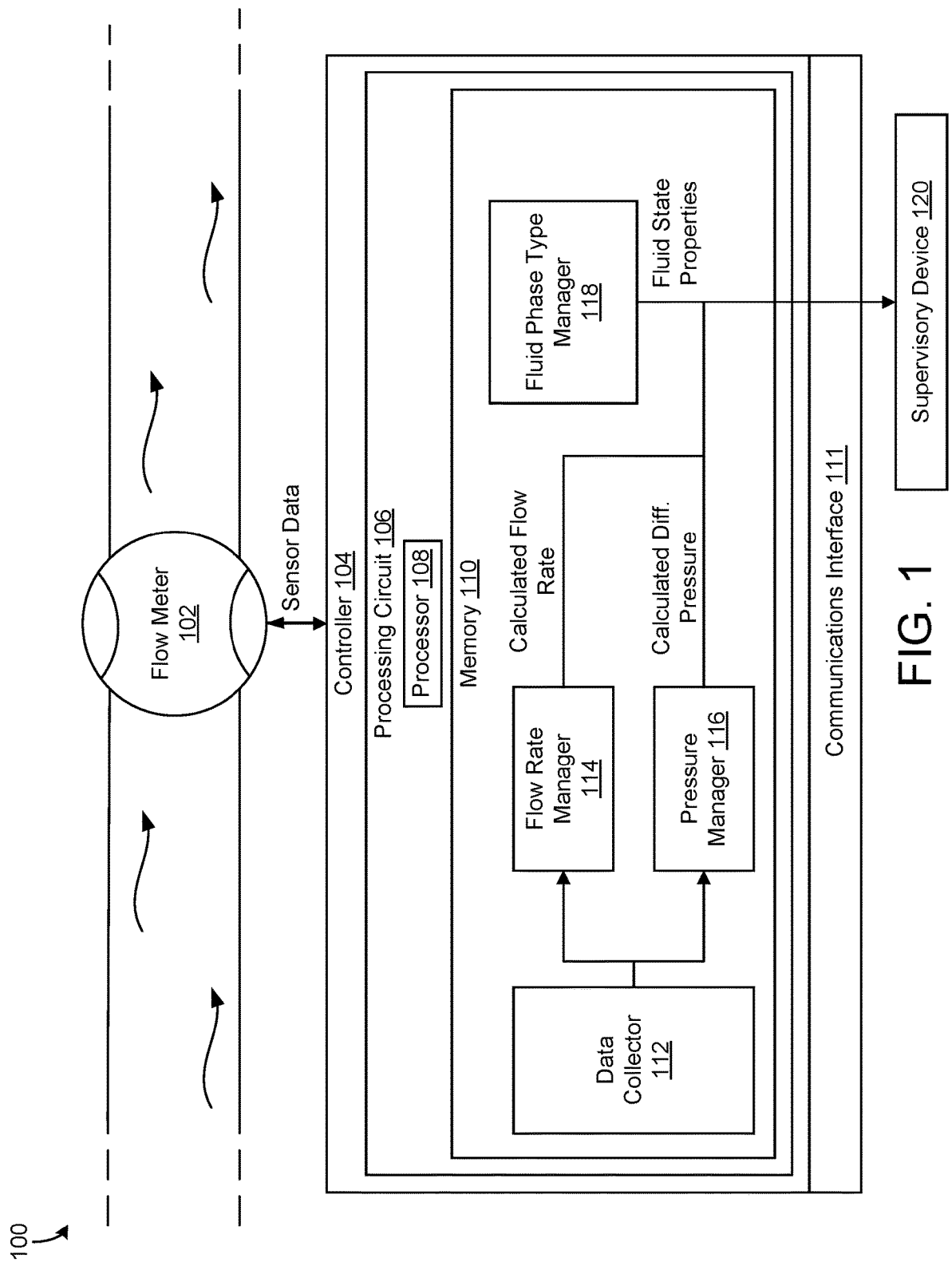
FIG. 1 is a block diagram of a flow control system, according to some embodiments.

Referring now to FIG. 1, a block diagram of flow control system ("system") 100 is shown, according to some embodiments. System 100 may be or include mechanisms for monitoring and/or controlling fluid flow within a piping subsystem. In some embodiments, the systems (e.g., system 100) and methods disclosed herein can be implemented within a variety of different industries and/or implementations, such as hydrocarbon systems, oil refinery systems, and building systems. System 100 is shown to include flow meter 102, controller 104, and supervisory device 120.

Flow meter 102 can be or include measuring devices that employ a range of technologies designed to quantify the rate or volume of a moving fluid (e.g., liquid fluid, gas fluid, liquid-gas combination fluid, etc.) in an open and/or closed conduit. Flow meter 102 can be or include any type of meter, such as Coriolis, differential pressure, magmeter, electromagnetic, oval gear, thermal, paddlewheel, positive displacement ultrasonic, or any combination thereof. In some embodiments, flow meter 102 includes one or more wired or wireless transmission devices (e.g., wireless sensors, transducers, etc.) configured to provide sensor data to controller 104 for processing.

In some embodiments, flow meter 102 is an ultrasonic flow meter. Ultrasonic flow meters may be configured to measure the velocity of a fluid using ultrasound to calculate volume flow. Using ultrasonic transducers, an ultrasonic flow meter may be able to measure the average velocity along the path of an emitted beam of ultrasound, by averaging the difference in measured transit time between the pulses of ultrasound propagating into and against the direction of the flow and/or by measuring the frequency shift from the Doppler effect. In some embodiments, ultrasonic flow meters are affected by the acoustic properties of the fluid and can be impacted by a variety of fluid parameters (e.g., temperature, density, viscosity, suspended particulates, etc.) depending on the exact flow meter.

Controller 104 may be configured to control, monitor, and/or adjust system 100 based at least in part on sensor data received from flow meter 102. Controller 104 is shown to include processing circuit 106 including processor 108 and memory 110. Processing circuit 106 can be communicably connected to communications interface 111 such that processing circuit 106 and the various components thereof can send and receive data via communications interface 111. Processor 108 can be implemented as a general purpose processor, an application specific integrated circuit (ASIC), one or more field programmable gate arrays (FPGAs), a group of processing components, or other suitable electronic processing components.

Communications interface 111 can be or include wired or wireless communications interfaces (e.g., jacks, antennas, transmitters, receivers, transceivers, wire terminals, etc.) for conducting data communications. In various embodiments, communications via communications interface 111 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 111 can include a Wi-Fi transceiver for communicating via a wireless communications network. In another example, communications interface 720 can include cellular or mobile phone communications transceivers.

Memory 110 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 110 can be or include volatile memory or non-volatile memory. Memory 110 can include database components, object code components, script components, or any other type of information structure for supporting the various activities and information structures described in the present disclosure. According to an example embodiment, memory 110 is communicably connected to processor 108 via processing circuit 106 and includes computer code for executing (e.g., by processing circuit 106 and/or processor 108) one or more processes described herein.

In some embodiments, controller 104 is implemented within a single computer (e.g., one server, one housing, etc.).

In various other embodiments plant controller 104 can be distributed across multiple servers or computers (e.g., that can exist in distributed and remote locations). Further, while FIG. 1 supervisory device 120 can be outside of plant controller 104, in some embodiments, the functionality of supervisory device 120 may be performed partially or entirely within controller 104 (e.g., within memory 110). Memory 110 is shown to include data collector 112, flow rate manager 114, pressure manager 116, and fluid phase type manager 118.

Data collector 112 may be configured to receive several different types of sensor data from any number of flow meters, including flow meter 102, such as flow rate data, characterization data (e.g., pipe diameter, fluid properties, etc.), differential pressure data, and temperature data. In some embodiments, the flow rate data is pre-processed (e.g., provided as a flow rate value). In other embodiments, the flow rate data is provided as a rate of pulses measured for a given flow rate (e.g., based on a K-factor of the meter, etc.) and the flow rate data is provided to controller 104 to be processed into an actual flow rate value. Data collector 112 is configured to provide the data to flow rate manager 114 and pressure manager 116.

Flow rate manager 114 may be configured to calculate a flow rate based on the measurements obtained by the sensors (e.g., ultrasonic transducers, etc.). In some embodiments, flow rate manager receives pulse information from ultrasonic transducers coupled with flow meter 102 and converts the pulse information into readable flow rate values. Flow rate manager may provide the calculate flow rate to supervisory device 120. Pressure manager 116 may be configured to determine pressure values from any point along the piping in which flow meter 102 is measuring. For example, flow meter 102 may include a two differential pressure sensors: one located upstream of flow meter 102 and downstream of flow meter 102. In some embodiments, the sensors can be placed at positions that measure the differential pressure between points within flow meter 102, such as upstream of an annular insert placed within the interior of flow meter 102 and downstream of the annular insert. This example and others are discussed in greater detail below.

Fluid phase type manager 118 may be configured to detect or determine the composition of the fluid as it relates to its phase. For example, fluid phase type manager 118 may be configured to determine that the fluid passing through flow meter 102 is substantially (e.g., over 50%, 70%, 100% etc.) liquid, substantially gaseous, or any variation therebetween. The phase makeup of the fluid can be provided to a user interface (e.g., on supervisory device 120, on a mobile device, on a workstation, etc.).

Supervisory device 120 may be any device that can communicate with controller 104 to make adjustments to the control techniques of system 100. For example, supervisory device 120 is a workstation or workplace terminal operated by a building technician. The building technician make be configured to receive the analytics produced by controller 104 and make control decisions. In other embodiments, supervisory device 120 is integrated within controller 104 and controller 104 automatically updates and manages the control techniques.

Flow Meter with Insert Element

Figure 2:
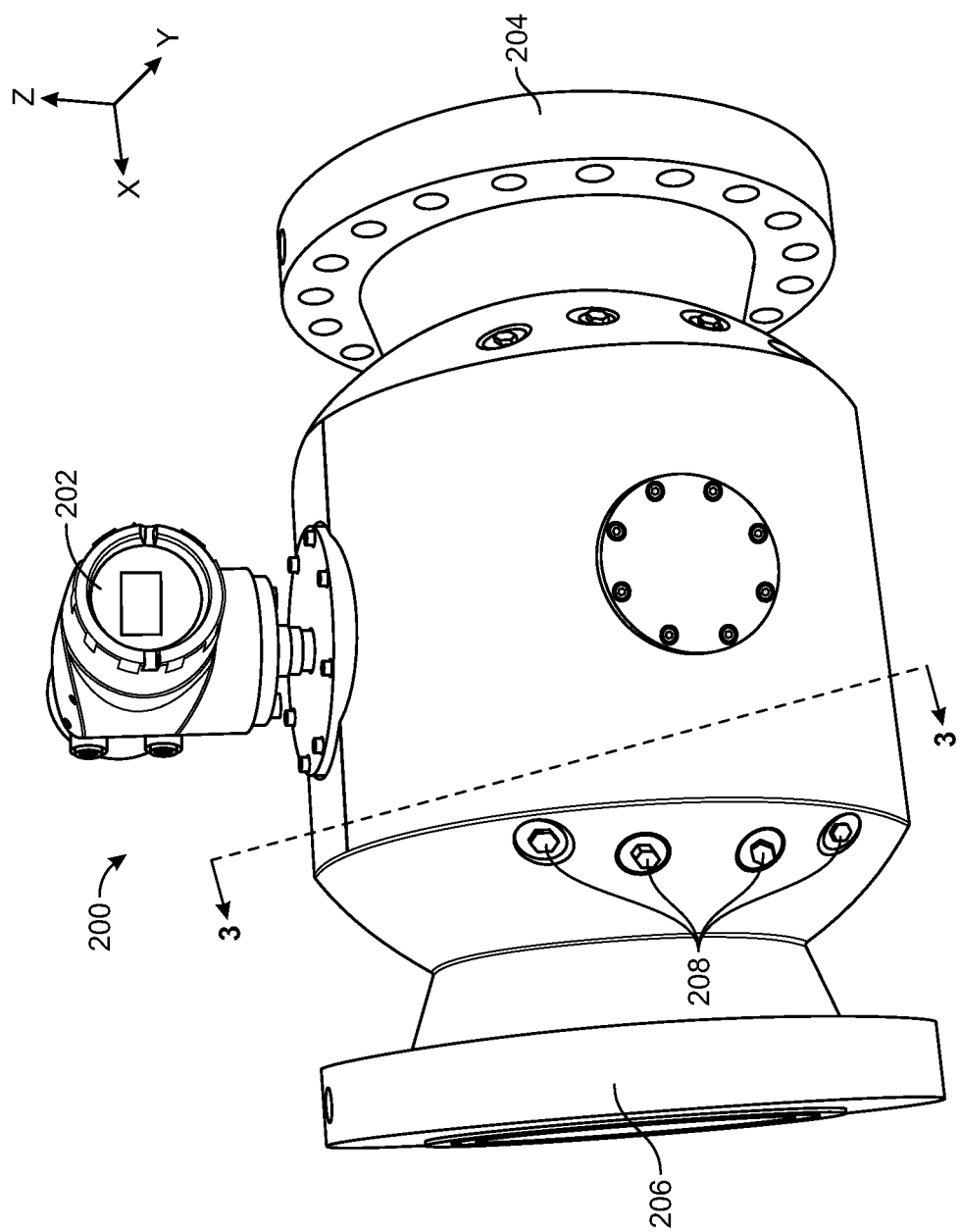
FIG. 2 is a perspective view of a flow meter, which can be implemented in the flow control system of FIG. 1, according to some embodiments.

Referring now to FIG. 2, a diagram of flow meter 200 is shown, according to some embodiments. Flow meter 200 may be identical or substantially similar to flow meter 102 as described above with reference to FIG. 1. Flow meter 200 is shown to include meter electronics 202, ports 204, 206, and transducer ports 208. While the systems and methods disclosed herein generally refer to ultrasonic flow meters—such as flow meter 200 as shown in FIG. 2—but this is merely meant to be exemplary and should not be considered limiting, as other types of flow meters may be considered. Additionally, ports 204, 206 may act as an inlet port or an outlet port respectively, and/or vice versa.

In some embodiments, meter electronics 202 includes a processing circuit including one or more processors and memory (not shown). The processor can be implemented as a general purpose processor, an application specific integrated circuit (ASIC), one or more field programmable gate arrays (FPGAs), a group of processing components, or other suitable electronic processing components.

The memory (e.g., memory unit, storage device, etc.) can include one or more devices (e.g., RAM, ROM, Flash memory, hard disk storage, etc.) for storing data and/or computer code for completing or facilitating the various processes, layers and modules described in the present disclosure. The memory can be or include volatile memory or non-volatile memory. The memory can include database components, object code components, script components, or any other type of information structure for supporting the various activities and information structures described in the present disclosure. According to an example embodiment, The memory is communicably connected to the processor via the processing circuit and includes computer code for executing (e.g., by the processing circuit and/or the processor) one or more processes described herein. In some embodiments, meter electronics 202 is implemented within a single computer (e.g., one server, one housing, etc.). Further, while FIG. 1 controller 104 outside of meter electronics 202, in some embodiments, the functionality of controller 104 may be performed partially or entirely within meter electronics 202.

Meter electronics 202 may be configured to control the excitation and detection of ultrasonic signals. Meter electronics 202 may be supplied with configuration parameters from the controller 104, in some embodiments. In some embodiments, a variety of sensing devices (e.g., ultrasonic transducers, temperature sensors, etc.) may supply sensor data to meter electronics 202 and/or controller 104 for processing. Meter electronics 202 may process and convert flow measurement results using configuration data (e.g. geometry information and calibration coefficients, etc.) which may or may not include fluid property information. In some embodiments, the functionality of meter electronics 202 may be performed partially or entirely within controller 104. The functionality of controller 104 is described above in greater detail with reference to FIG. 1.

Similarly, the functionality of controller 104 may be performed partially or entirely within meter electronics 202, in some embodiments. For example, the flow rate would derive from the ultrasonic measurements only. With the addition of pressure, temperature or differential pressure measurements, corrections and/or supplementary calculations may be performed (e.g., in a wet-gas application, the supplementary sensors could be used to improve the estimation of the gas rate and/or estimate the liquid rate, etc.). In some embodiments, although conceived as an ultrasonic meter, in principle a combination of differential pressure measurements could be used without the ultrasonic transducers (e.g., a differential pressure measurement from inlet port 204 to an insert, plus a measurement along the length of outer passageway, etc.). This is described in greater detail below with reference to FIG. 6.

Figure 3:
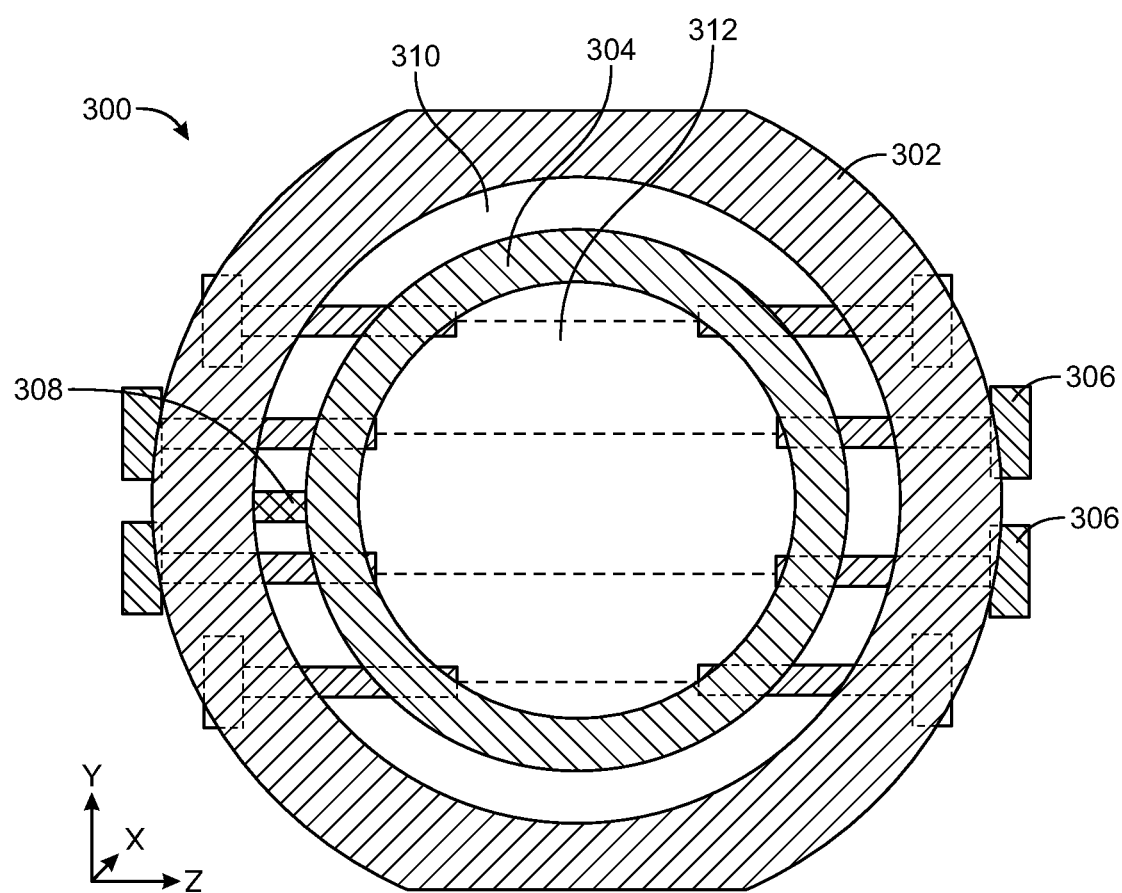
FIG. 3 is a sectional view of the flow meter of FIG. 2, according to some embodiments.

Referring now to FIG. 3, a diagram 300 showing a cross-sectional view of the interior of flow meter 200 is shown, according to some embodiments. Diagram 300 shows a perspective view with the downstream of the fluid going into the page. Diagram 300 shows flow meter housing ("housing") 302, insert 304, transducer housing(s) 306, coupling element 308, flow meter outer passageway ("passageway") 310 and flow meter inner passageway ("passageway") 312.

In some embodiments, the insert 304 is an annular piece of material (e.g., plastic, metal, etc.) that is placed within the interior of flow meter 200 such that the fluid coming downstream may come into contact with insert 304 and separate into at least two paths. Insert 304 can be or include any number of shapes and sizes. For example, the end of insert 304 that initially makes contact with the flowing fluid (i.e., the upstream end of insert 304, etc.) may be curved, tapered, pointed, or any other shape not presently disclosed. The shape of the upstream end of insert 304 may be shaped in such a way that facilitates the fluid flow to separate into a first portion that flows through passageway 312 and a second portion that flows through passageway 310.

Figure 4:
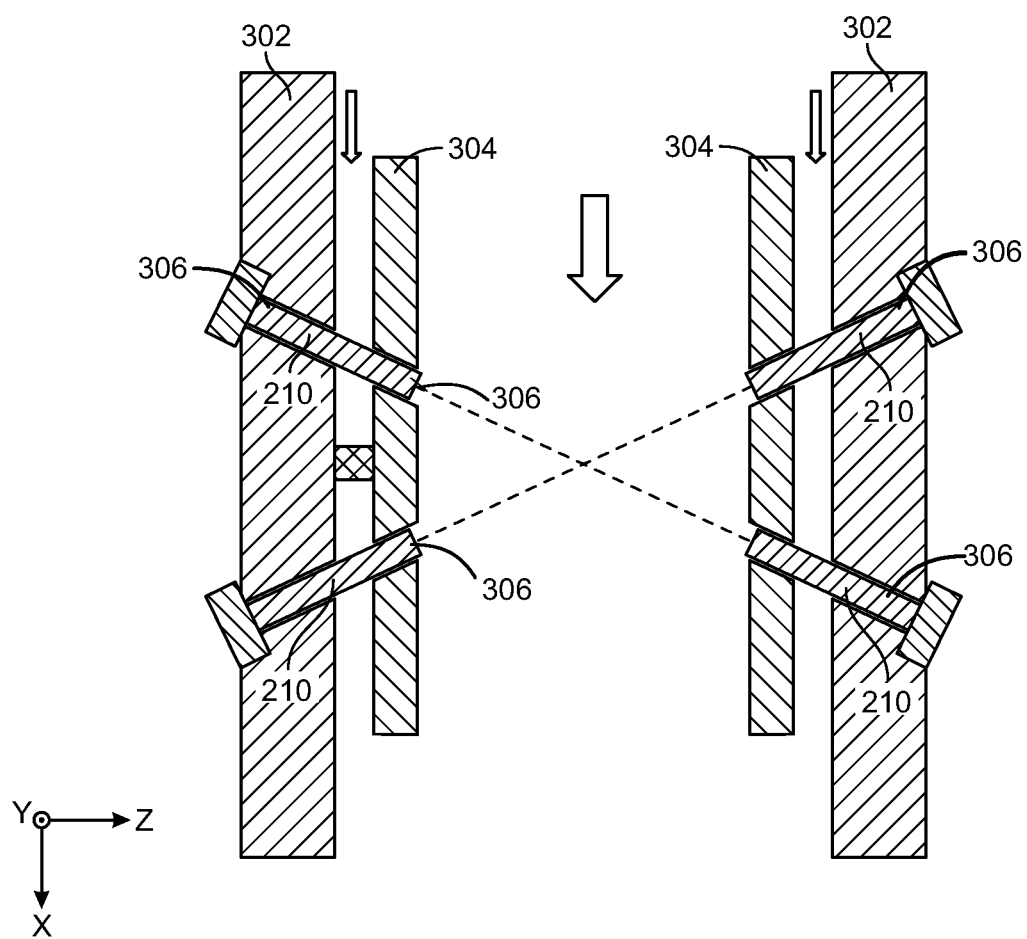
FIG. 4 is a sectional view of the flow meter of FIG. 2, according to some embodiments.

Insert 304 may also be any length that can extend along the axis of flow meter 200. For example, insert 304 can be a substantially short ring, a long cylindrical tube that extends along the entire length of flow meter 200, or any length therebetween. Insert 304 may also be any thickness, and is not limited to the ring-shaped thickness as shown in FIG. 3. For example, insert 304 may be substantially thick such that passageway 312 has a significantly smaller cross-sectional area than is shown in FIG. 3. While insert 304 is generally shown to be uniform along its length (e.g., as shown in FIG. 4), this is merely meant to be exemplary and should not be considered limiting. The thickness (Y-Z plane) and/or the general shape of insert 304 can vary across the length (X-Y plane) of insert 304.

Still referring to FIG. 3, transducer housing(s) 306 are shown to extend from the outside of housing 302, through housing 302, across passageway 310, through insert 304, and into passageway 312. Transducer housing(s) 306 may be implemented as shown in FIG. 3 such that the transducers within transducer housing(s) 306 can provide ultrasonic pulses to the fluid flowing through passageway 312. While not shown, transducer housing(s) 306 can also be configured to provide ultrasonic pules to the fluid flowing through passageway 310.

While not shown in detail in FIG. 3, the actual transducer can be located inside transducer housing(s) 306. In some embodiments, the transducer housing(s) 306 is attached to housing 302, forming a seal that keeps the fluid from exiting. Of course, the method of attachment of housing 302 and transducer housing(s) 306 and sealing can vary (e.g., a flange on the outside of the meter body, use of O-rings, use of retaining rings, use of threaded seal(s), etc.), and should not be considered limiting.

In some embodiments, insert 304 is configured to separate the fluid into portions that allow for the majority of liquid volume of the fluid (e.g., of a wet-gas mixture, etc.) to pass through passageway 310, with a majority of the gaseous fluid volume to pass through passageway 312. As such, the separated portion of the liquid fluid flowing in passageway 310 may contain a greater proportion of the liquid fluid by volume than the liquid fluid flowing in passageway 312 in some embodiments. In some embodiments, almost all the liquid fluid flows through passageway 310 as oppose to passageway 312.

Referring now to FIG. 4, another cross-sectional view of the interior of flow meter 200 is shown, according to some embodiments. FIG. 4 shows a view of transducer housing(s) being installed through housing 302 and insert 304. The larger arrow shows passageway 312, while the smaller arrow shows the flow path for taking passageway 310. FIG. 4 also shows housing portion(s) 210. In some embodiments, the actual transducer module that performs the ultrasonic pulses are located within the housing portion(s) 210 (e.g., near the end at passageway 312, etc.).

Figure 5:
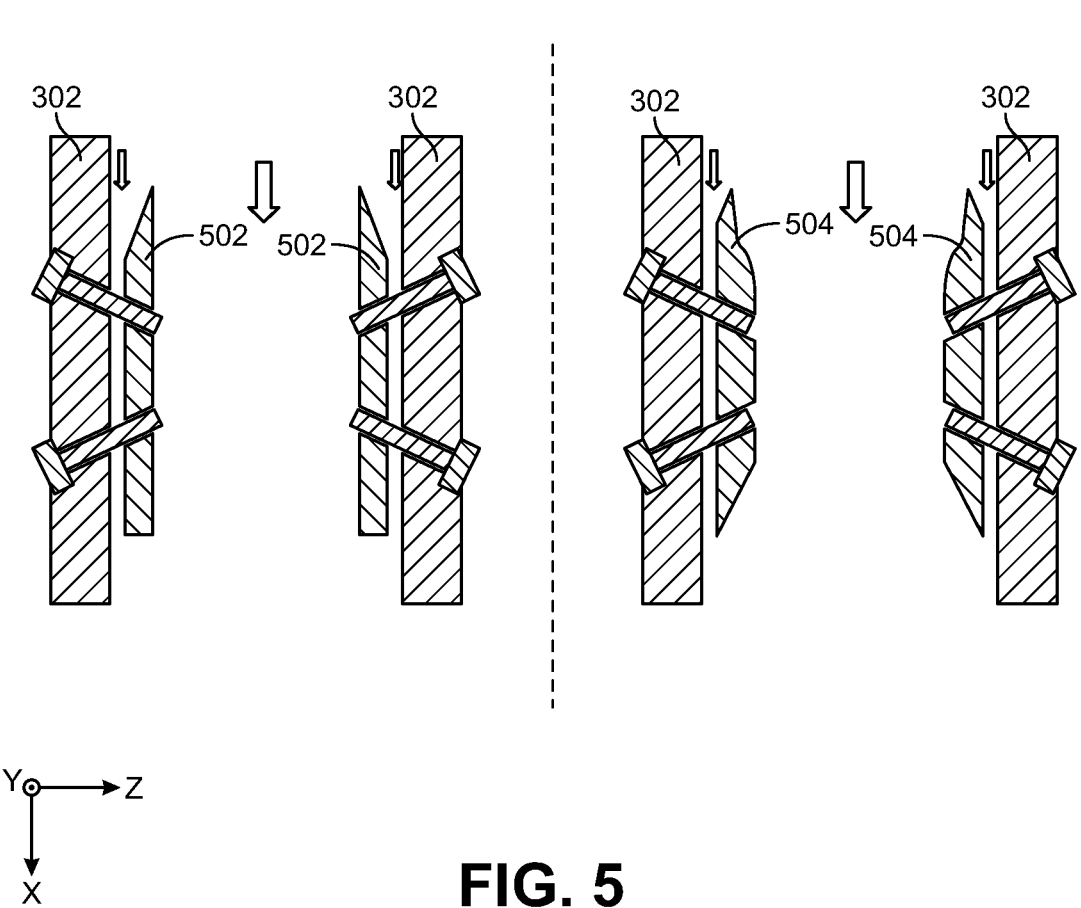
FIG. 5 is a diagram of several sectional views of the flow meter of FIG. 2, according to some embodiments.

Referring now to FIG. 5, several sectional views of flow meter 200 are shown, according to some embodiments. FIG. 5 shows different implementations of insert 304, shown as insert 502 and insert 504 in the different embodiments depicted in FIG. 5. In some embodiments, insert 502 and/or insert 504 are substantially similar or identical to insert 304. In other embodiments, insert 502 and/or insert 504 have similar functionality as insert 304 but may at least be partially a different shape (e.g., a different end contour, etc.).

For example, the left side of FIG. 5 shows insert 502 with a pointed shape, indicating that—assuming insert 502 is an annular shape that creates a ring-like structure—the upstream end is slanted to create an edge. This may be done to allow the fluid to more easily separate into its respective portions (e.g., into passageways 310 and 312, etc.). In another example, the right side of FIG. 5 shows insert 504 with a varying cross-sectional area throughout passageway 312 (i.e., where the arrow is pointing), along with an opposing edge on the upstream side of the insert when compared to insert 502.

Overall, any shape, length, thickness, or end formations can be considered for insert 304 (e.g., and insert 502, 504). In some embodiments, the cross-sectional area for passageway 310 and/or passageway 312 varies (e.g., continually decreases, continually increases, increases and decreases at varied intervals, etc.). Additionally, one or both ends of insert 304 can be flat surfaces, contoured, pointed, slanted, tapered, or a combination thereof, and should not be limited to the embodiments disclosed herein.

As shown in FIG. 5, insert 502 can have pointed ends, rounded ends, curved ends, jagged ends, or any combination thereof. Similarly, the sides (e.g., the surfaces along the same axis as the housing, etc.) can be jagged (e.g., having ebbs and flows along the surface, etc.), smooth, or a varied combination along the length of the surface. Insert 502, as it extends along the axis of housing 302, does not need to be uniform, and can increase in height, decrease in height, or otherwise change shape and/or thickness as it extends along the axis.

Flow Meter with Pressure Measurement Functionality

Figure 6:
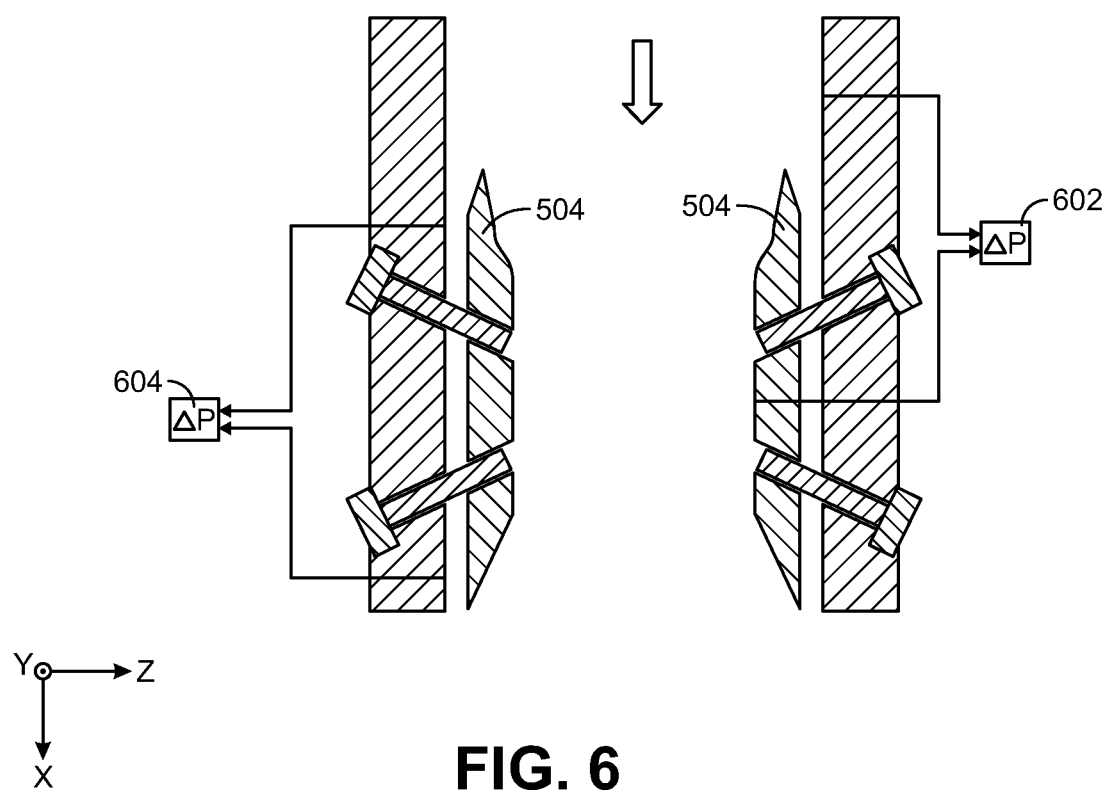
FIG. 6 is a sectional view of the flow meter of FIG. 2, according to some embodiments.

Referring now to FIG. 6, another cross-sectional view of the interior of flow meter 200 with differential pressure measurements is shown, according to some embodiments. FIG. 6 is shown to include differential pressure sensors ("sensors") 602 and 604. In some embodiments, sensors 602, 604 are substantially similar or identical. Sensors 602, 604 may act as differential pressure sensors, which can be configured to measure the difference between two pressures: one connected to each side of the sensor. In some embodiments, sensors 602, 604 measure the difference in pressure between locations within the interior of flow meter 200.

As shown on the left side of FIG. 6, sensor 604 measures the differential pressure between (i) the pressure immediately entering passageway 310 (e.g., the outer passageway between insert 504 and housing 302, etc.) and (ii) the pressure immediately leaving passageway 310 when the fluid within passageway 310 reunites with the other separated portion that flowed through passageway 312. As shown on the right side of FIG. 6, sensor 602 measures the differential pressure between (i) the pressure prior to contacting insert 504 and separating into two portions and (ii) the pressure within passageway 312 between the two sets of transducers.

As disclosed herein, sensors 602, 604 can include any number of differential pressure sensors (e.g., 1 sensor, 3 sensors, 5 sensors, etc.) and may be configured to measure the difference of two pressures located anywhere within housing 302 (e.g., between two points within passageway 310, between two points within passageway 312, between a point within passageway 310 and a point within passageway 312, between a point prior to reaching insert 504 and a point after fluid rejoins and passes insert 504, between a point prior to reaching insert 504 and a point within one of the passageways, between a point within one of the passageways and a point after fluid rejoins and passes insert 504, etc.).

Figure 7:
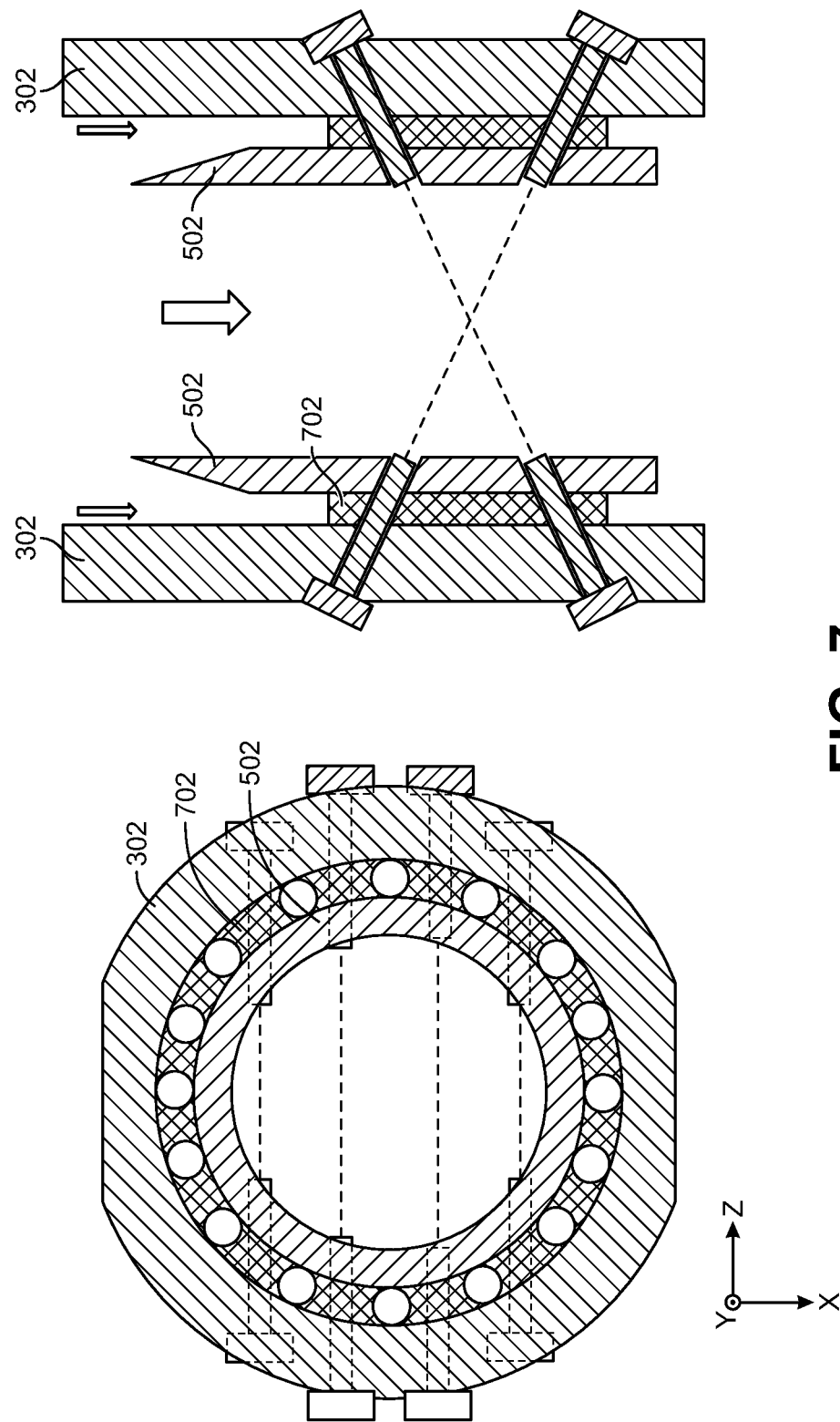
FIG. 7 is a diagram of several sectional views of the flow meter of FIG. 2, according to some embodiments.

Referring now to FIG. 7, another cross-sectional view of the interior of flow meter 200 is shown, according to some embodiments. FIG. 7 is shown to include coupling element ("element") 702. In some embodiments, coupling element 702 is configured to mount an inert (e.g., insert 304, insert 502, etc.) to the interior of flow meter 200, but still permit the passage of fluid in/around element 702 so as not to restrict fluid flow. For example, on the left side of FIG. 7, element 702 is shown to include a plurality (e.g., two, 10, 20, etc.) of apertures (e.g., holes, etc.) spaced apart, such that the material of element 702 is displaced enough to adequately couple insert 502 with housing 302, but includes a sufficient amount of opening space (e.g., via the apertures) to allow fluid to pass through element 702.

In some embodiments, element 702 is an annular shaped ring, prismatic with open ends, or tube-shaped structure that encloses insert 502. In other embodiments, element 702 is merely a fastening device that couples insert 502 with housing 302 from a single (or a few) locations. Of course, any number of apertures can be included within element 702 and should not be limited to those shown in FIG. 7. In some embodiments, element 702 can be any type of device capable of coupling insert 502 with housing 302, and is not limited to a ring-shaped fastener, a tube-shaped fastener (e.g., similar to a ring-shaped fastener but extends along the length of inert 502 to create a tube shaped fastener, etc.), or a single fastening point. While the systems and methods disclosed herein generally refer to insert 502 (e.g., or any other insert described herein) being coupled with housing 302 by means of a separate element 702, a coupling element may not be required and insert 502 may be manufactured with housing 302 as a single unit (not shown).

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A flow meter comprising:
    a first housing extending along an axis and defining an interior volume, the interior volume extending between an inlet port and an outlet port;
    an insert positioned within the interior volume and spaced apart from the first housing, the insert extending along the axis, wherein a first region between at least part of the insert and the first housing along the axis defines a first flow pathway, and a second region within the insert and along the axis defines a second flow pathway;
    a pressure sensor configured to obtain differential pressure measurements between at least one of:
        an upstream portion of the first region and a downstream portion of the first region, or
        a first location upstream of the insert and a second location within the insert; and
    an ultrasonic transducer disposed in a transducer housing, the transducer housing extending from outside the first housing through the first housing, across the first flow pathway, through the insert, and into the second flow pathway.

2. The flow meter of claim 1, wherein a cross-sectional area of the first flow pathway varies as the first flow pathway extends along the axis.

3. The flow meter of claim 1, wherein a cross-sectional area of the second flow pathway varies as the second flow pathway extends along the axis.

4. The flow meter of claim 1, wherein a surface of the insert perpendicular to the axis is at least one of a tapered surface or a contoured surface.

5. The flow meter of claim 1, wherein the inlet port and the outlet port are disposed along the axis.

6. The flow meter of claim 1, wherein the insert is coupled to the first housing using a coupling element, the coupling element comprising a plurality of apertures that can facilitate flow through the coupling element.

7. The flow meter of claim 1, further comprising: a plurality of additional ultrasonic transducers extending from outside the first housing through the first housing, across the first flow pathway, through the insert, and into the second flow pathway.

8. A system for monitoring flow of a fluid, the system comprising:
    a flow meter comprising:
        a first housing extending along an axis and an interior volume, the interior volume comprising an inlet port and an outlet port;
        an annular insert positioned within the interior volume and radially spaced apart from the first housing, the annular insert extending along the axis;
    wherein:
        the annular insert comprises a first surface along the axis and a second surface perpendicular to the axis;
        a cross-sectional area of the first surface perpendicular to the axis varies as the first surface extends along the axis;
        the flow meter further comprises a pressure sensor configured to obtain differential pressure measurements between at least one of:
            an upstream portion of a first region defined between the annular insert and the first housing and a downstream portion of the first region, or
            a first location upstream of the annular insert and a second location within the annular insert, and
        an ultrasonic transducer disposed in a transducer housing, the transducer housing extending from outside the first housing through the first housing, across the first region, through the insert, and into a second region within the insert.

9. The system of claim 8, wherein the first surface of the annular insert is at least one of a tapered surface extending along the axis or a contoured surface extending along the axis.

10. The flow meter of claim 8, wherein the second surface of the annular insert is at least one of a tapered surface or a contoured surface.

11. The system of claim 8, wherein the inlet port and the outlet port are disposed along the axis.

12. The system of claim 8, wherein the annular insert is coupled to the first housing using an annular coupling element, the annular coupling element comprising a plurality of apertures that can facilitate flow through the annular coupling element.

13. The system of claim 8
further comprising a plurality of additional ultrasonic transducers each disposed in an additional transducer housing extending from outside the first housing through the first housing, across the first region, through the insert, and into the second region.

14. A method for obtaining flow measurements, the method comprising:
receive fluid via an inlet port of a flow meter;
separate the fluid using an annular insert disposed within an interior volume of the flow meter, the annular insert radially spaced apart from a first housing of the flow meter and aligned with the first housing on an axis;
obtain flow measurements of a first separated portion of the fluid within a first region defined within the annular insert via an ultrasonic transducer, wherein the ultrasonic transducer is disposed in a transducer housing, the transducer housing extending from outside the first housing through the first housing, and through the insert;
obtain differential pressure measurements comprising at least one of:

a first differential pressure between an upstream portion of the first region and a downstream portion of the first region, or a second differential pressure between a first location upstream of the annular insert and a second location within the annular insert; and rejoin the first separated portion of the fluid and a second separated portion of the fluid within a second region defined between at least part of the annular insert and the first housing downstream of the annular insert.

15. The method of claim 14, wherein the second separated portion of the fluid comprises a greater proportion of fluid by volume than the first separated portion of the fluid.

16. The method of claim 14, wherein obtaining the flow measurements of the first separated portion of the fluid comprises using a plurality of additional ultrasonic transducers to obtain the flow measurements, each disposed in an additional transducer housing extending from outside the first housing through the first housing, across the first region, through the insert, and into a second region within the insert.

17. The method of claim 14, wherein separating the fluid using the annular insert comprises separating the fluid using a first surface of the annular insert, wherein a cross-sectional area of the first surface perpendicular to the axis varies as the first surface extends along the axis.

18. The method of claim 17, wherein, in response to the fluid contacting the first surface, the fluid is separated into the first separated portion of the fluid and the second separated portion of the fluid.

* * * * *